INVENTOR.
C WALTON MUSSER

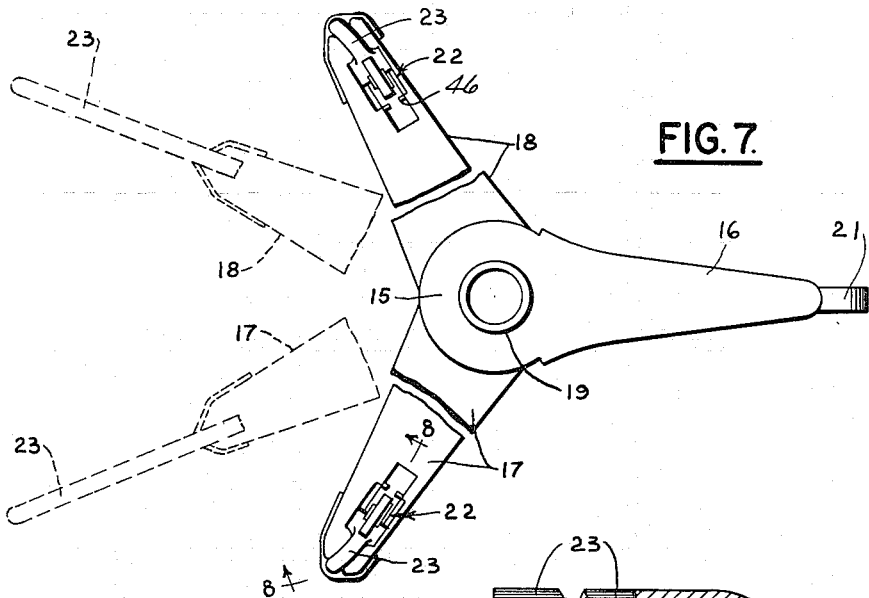
FIG. 7.
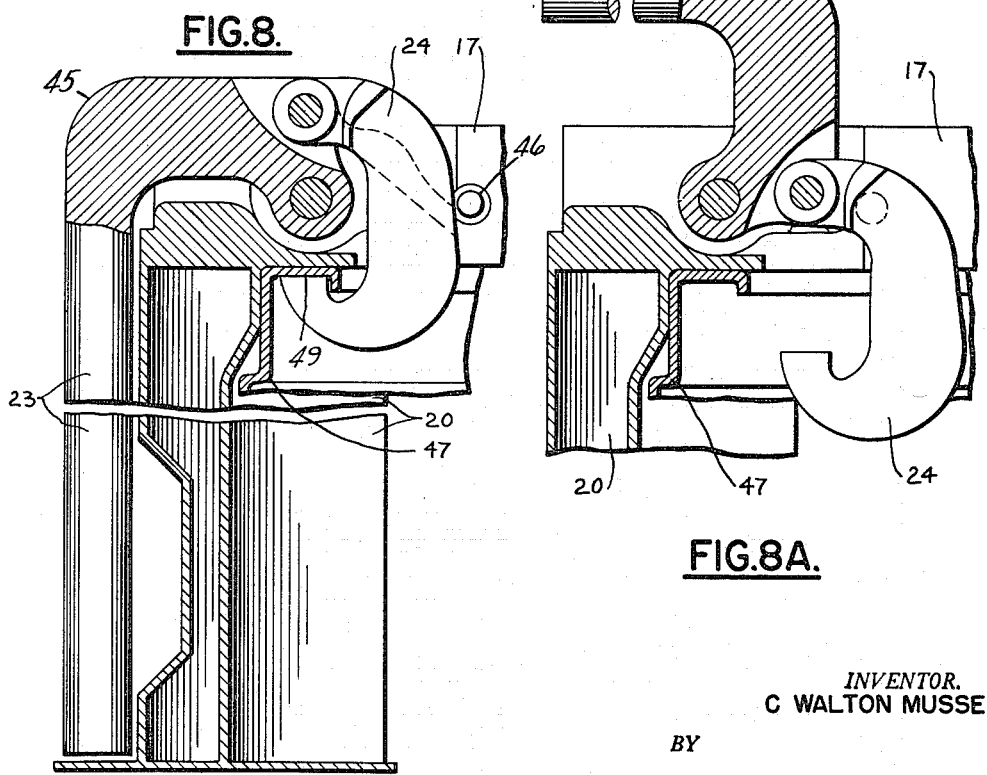
FIG. 8.
FIG. 8A.

Sept. 29, 1959 C W. MUSSER 2,906,176
QUICK DETACHABLE GUN SUPPORTING TRIPOD
Filed July 18, 1957 5 Sheets-Sheet 5

INVENTOR.
C WALTON MUSSER
BY

United States Patent Office 2,906,176
Patented Sept. 29, 1959

2,906,176

QUICK DETACHABLE GUN SUPPORTING TRIPOD

C Walton Musser, Beverly, Mass., assignor to the United States of America as represented by the Secretary of the Army Application July 18, 1957, Serial No. 672,846

3 Claims. (Cl. 89—40)

(Granted under Title 35, U.S. Code (1952), sec. 266)

The invention described herein may be manufactured and used by or for the Government for governmental purposes without the payment of any royalty thereon.

The present application is a continuation-in-part of my Patent 2,805,603 for "Gun Aiming Mechanism With Associated Trigger Release Mechanism and Supporting Mount," and relates to the supporting mount.

This invention is particularly applicable to the support of recoilless rifles that have tremendous firepower in relation to their lightness in weight and ease of portability. However, attainment of maximum advantage and increased use of recoil-free firearms has been greatly curtailed by the lack of satisfactory lightweight and readily portable support means for these weapons.

Prior art mounts had originally been designed and constructed for use on conventional artillery pieces. Obviously, greater stresses and strains than those encountered in low or recoil-free firearms were to be encountered so that those mounts were, of necessity, rather bulky and ponderous. When used on low or recoil-free firearms, it was found that the great advantages inherent in that type of weapon could not be obtained because optimum use of those weapons was hampered by the addition of needless excess weight of the mount.

The mount of the present application is fabricated from sheet metal and welded, the legs being box-shaped in cross-section so as to gain the advantages of light-weight rigid construction, and is unique in that the mount can be attached to a carrier by means of quick-acting clamps on the mount, or it can easily and quickly be detached therefrom and used upon the ground. Should the occasion warrant, the mount, as shown in a preferred, alternate embodiment herein, may, by pivotally moving two of its legs closer together, easily be wheeled by one man over smooth terrain or by three men over rough terrain, in the manner of a wheelbarrow.

In addition, the mount may be used with other weapons having little or no recoil, such as anti-aircraft guns, rocket launchers and the like.

It is, therefore, an object of this invention to provide a supporting mount, in the form of a tripod, for use with a recoilless rifle, or other weapon with little or no recoil, that is extremely light in weight.

Another object of my invention is to provide a dual purpose supporting mount that is capable of being quickly and easily attached to, or detached from, a vehicle, such as a jeep. This permits the weapon on the mount to be used as a highly maneuverable, highly mobile, artillery piece in the first instance; or as an artillery emplacement, free of its transporting vehicle, in the second instance.

A still further object of my invention is to provide a mount that is capable of being wheeled, with the gun in place thereon, from place to place over the terrain.

In furtherance of these objects, I have, in addition to providing a rigid tripod supporting mount, provided a tripod support mount with a wheel affixed to the free end of one tripod member; said support mount being extremely light in weight, being capable of being secured to a vehicle releasably, and said mount having provision for moving two of the tripod legs in a horizontal plane towards each other so that one man, grasping certain handles at the free end of each of the other two tripod legs, may move the mount and gun over the terrain, in the manner of a wheelbarrow.

All of the foregoing, as well as other objects and advantages, will become apparent from a study of the following description, taken in conjunction with the following drawings, wherein like characters of reference indicate corresponding parts throughout the several views and wherein:

Fig. 7 is a plan view of the new and preferred alternate embodiment of the tripod support and clamping means with two of the tripod legs also shown in a wheelbarrow position by dash lines.

Fig. 8 is a cross-section taken along line 8—8 of Fig. 7 through the leg and clamp with the clamp in the closed position.

Fig. 8A is similar to Fig. 8, but shows the clamp in the open position.

Figure 1:
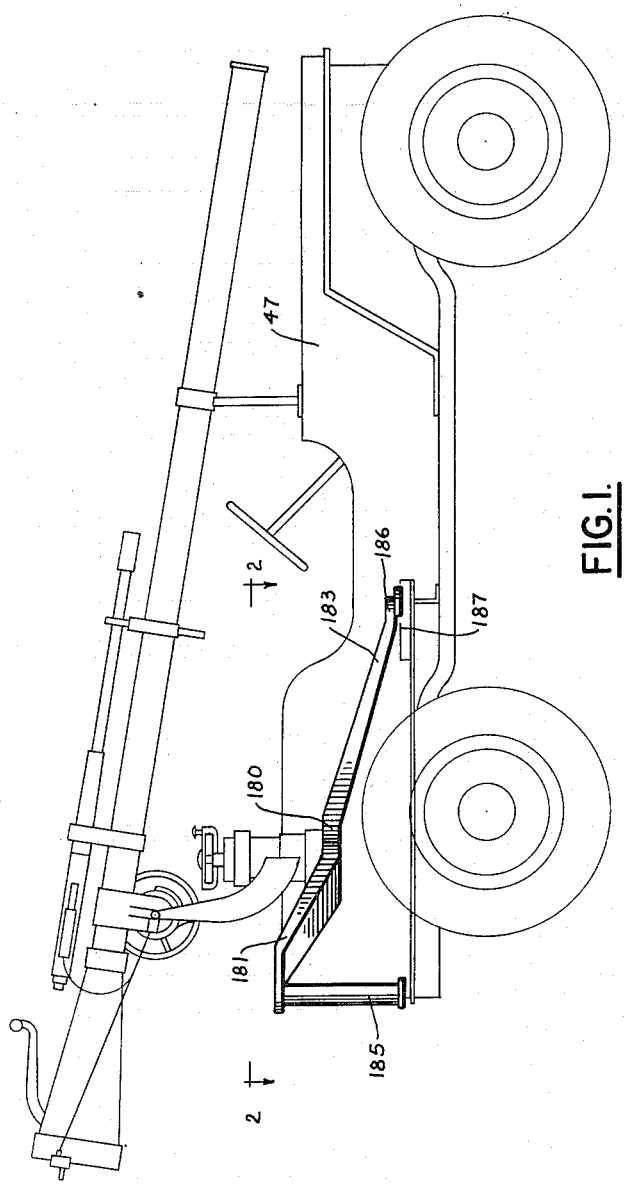
Fig. 1 is a side view showing one embodiment of the tripod support, sans the quick-acting clamps, with a gun and its appurtenances affixed thereto, the support being carried by a representative motor vehicle which takes the form of a jeep; all but the support being shown to light, solid lines.
Figure 2:
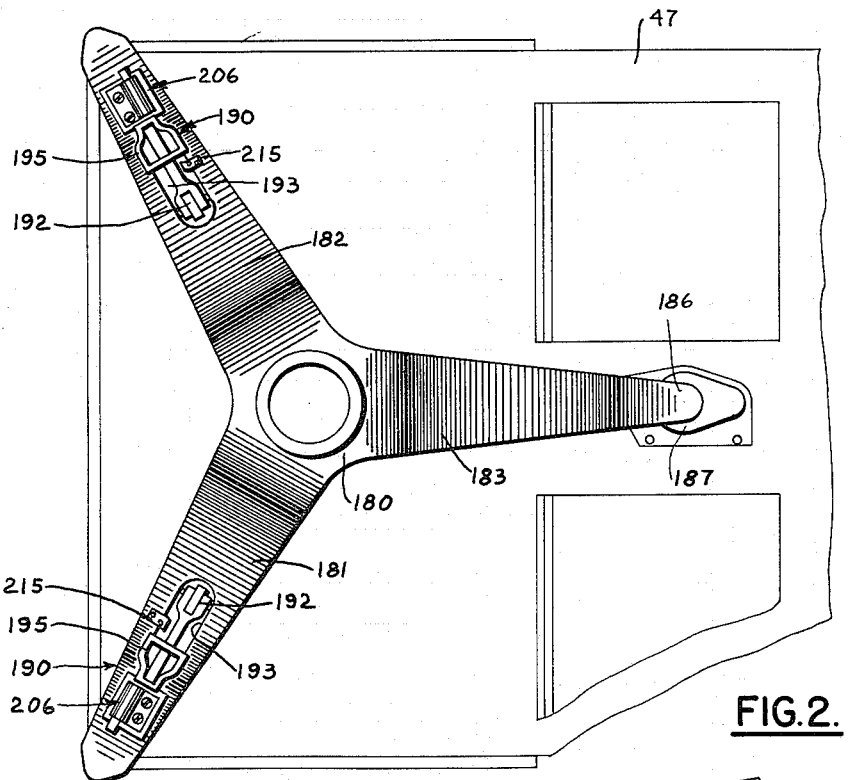
Fig. 2 is a view, taken along line 2—2 of Fig. 1, of the tripod support with the quick-acting clamps, and of a portion of the motor vehicle; the latter being shown in light, solid lines.
Figure 6:
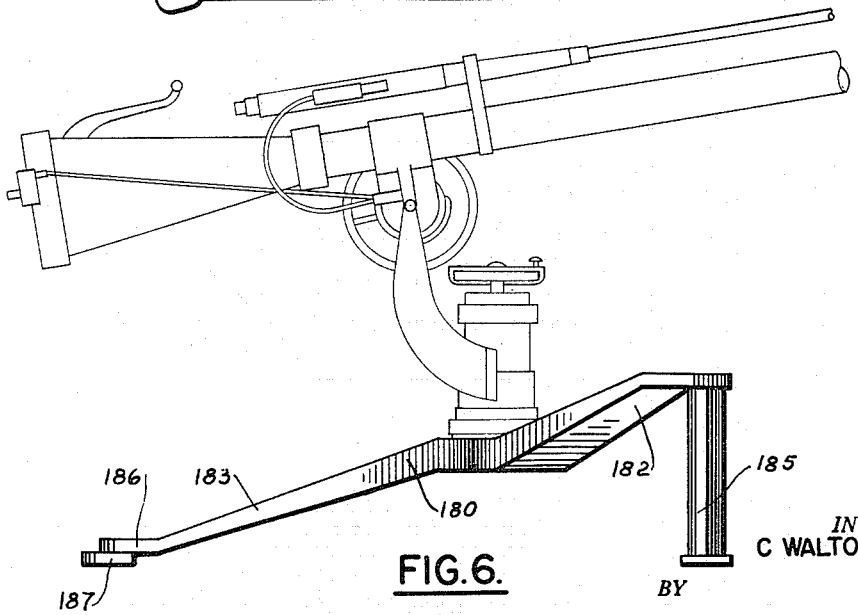
Fig. 6 is a view, similar to Fig. 1, showing the tripod support detached from the motor vehicle and placed upon the ground, or other fixed surface.
Figure 3:
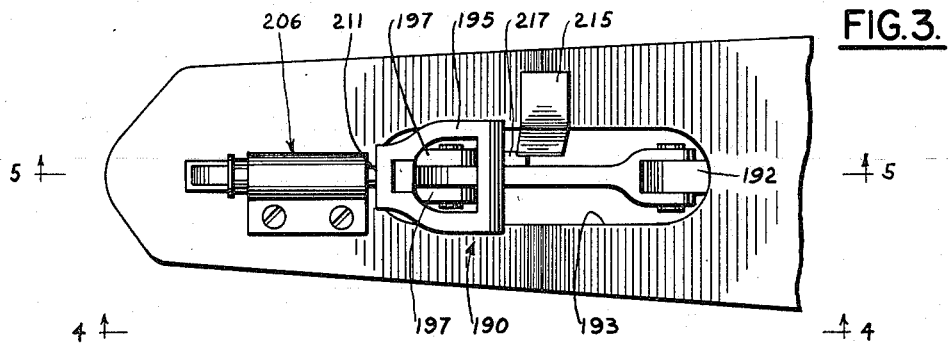
Fig. 3 is a view of the clamping means by which the tripod support is secured onto the jeep, or other carrier. This figure is actually an enlargement of the two corresponding portions of Fig. 2.
Figure 4:
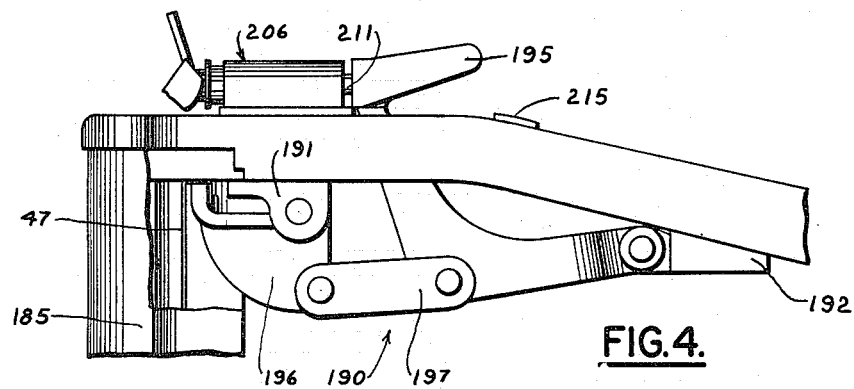
Fig. 4 is a view, partly broken away and partly in section, of the clamping means in the "closed and locked" position and taken along lines 4—4 of Fig. 3.
Figure 5:
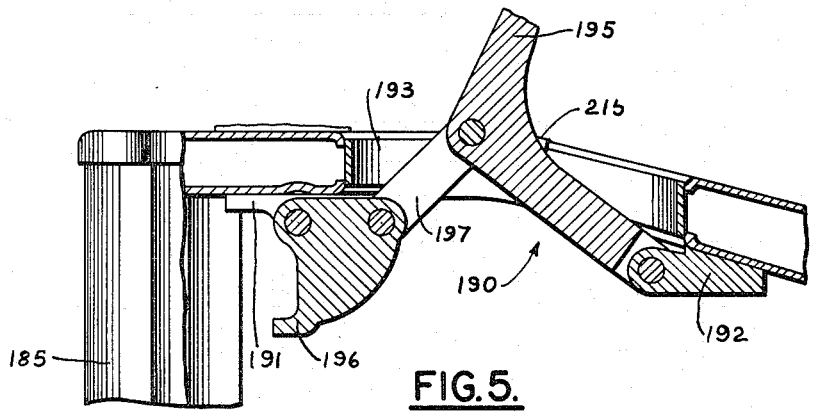
Fig. 5 is a cross-section taken along line 5—5 of Fig. 3 and showing the clamp in the "unlocked and open" position.
Figure 9:
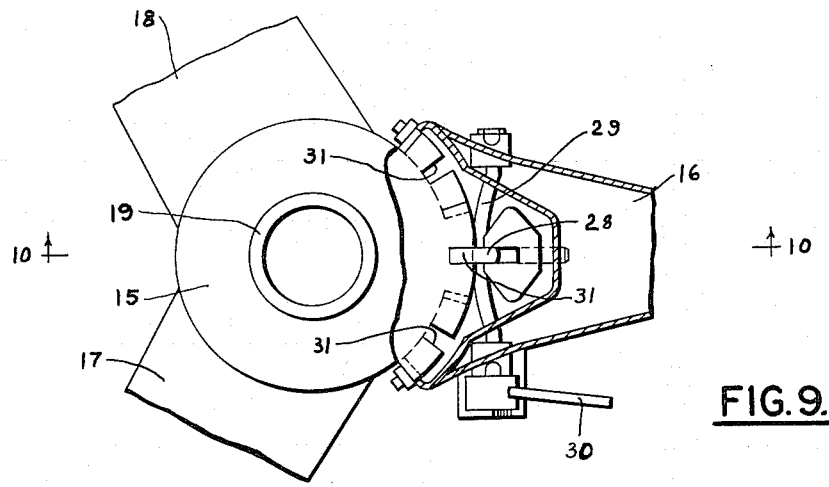
Fig. 9 is an enlargement, partly broken away and partly in section, of a portion of Fig. 7 showing the locking arrangement for the movable legs.
Figure 10:
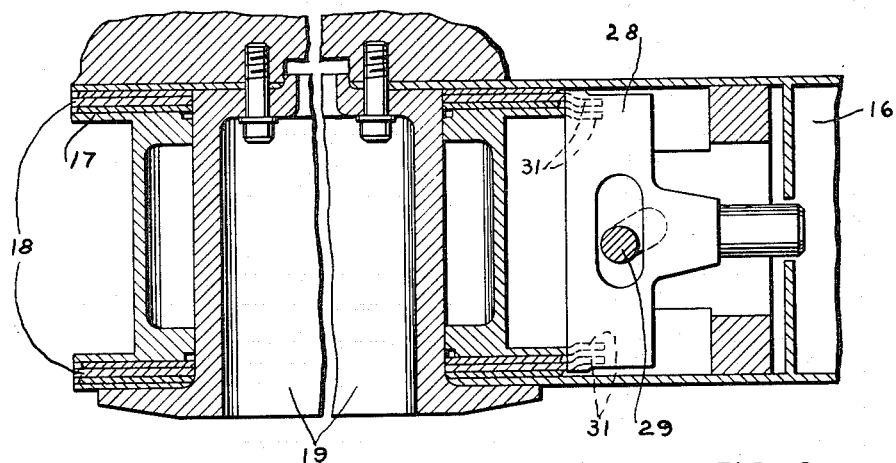
Fig. 10 is a cross-section along line 10—10 of Fig. 9 showing the locking arrangement in the locking position.
Figure 11:
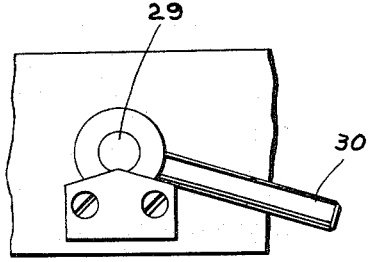
Fig. 11 is an outside side view of the locking assembly.

Essentially, one embodiment of the mount comprises the horizontal seat portion 180 from which the legs 181, 182, and 183 extend radially outward and are equally spaced angularly with respect to each other, as viewed in Fig. 2. Legs 181 and 182 are similar in shape and construction, but of opposite reference (i.e., leg 181 may be considered as the left leg, and leg 182 may be considered as the right leg).

Legs 181 and 182, in extending away from the mount's horizontal seat portion, slope upward until, near their outer ends, each changes direction and terminates in the horizontally extending end portion. Projecting downward from the end portion of each of these legs is the riser 185. The free ends of these risers terminate below the tripod's seat portion in an imaginary plane parallel thereto.

Leg 183, in extending away from the mount's horizontal seat portion, slopes downward until, near its outer end, it changes direction and terminates in the horizontally extending end portion 186, provided with foot 187; the latter being parallel to the seat portion and being at substantially the same distance below the seat portion as the bottom of each riser.

In order that the tripod may be easily and rapidly attached to, or detached from an extension portion 49 of a vehicle frame, where said vehicle is the jeep 47, or other carrier, legs 181 and 182 are each equipped with a clamp 190. Each clamp is secured to the paired, spaced lugs 191 and to the lug 192 which are affixed to the undersurface of legs 181 and 182 at opposite ends of the opening 193 therethrough. Each clamp has an operating lever 195, a jaw 196 and connecting links 197. The jaw is pivotally mounted between the spaced lugs whereby it may be moved to or from a clamping position.

In operation, clamp 190 is capable of being moved from an open position to a closed and locked position; the clamp being securely held in the latter position by means of the lock 206 attached to each of the legs 181 and 182. The lock has a slidable release 211 which is releasably engageable with the operating lever to lock the clamping means in the closed position. When the release is disengaged from the operating lever, that lever can be pulled upward to place the clamp in the open position.

Each clamp is held in the open position by means of a leaf spring 215; the spring snapping under a lug 217 on each operating lever, when the lever is moved to the open position. A slight push downward on the operating lever will release it from its spring engagement, whereby the lever may be returned to the closed position.

The seat of the tripod mount, upon which the gun and its appurtenances are attached, has an internal reinforcement in the form of an annular cylinder to which each of the tripod legs are attached.

Where it is desirable to have a weapon which, through the agency of its mount, can be easily attached to a vehicle, or quickly detached therefrom and used upon the ground, overall lightness in weight of the gun and its appurtenances, including the mount, is highly important. Lightness in weight, however, must not be attained at the expense of strength and rigidity of the gun's mount. The novel feature of my tripod support is the exceptional strength and rigidity obtained in relation to its weight. Prior art mounts of comparable strength are so ponderous as to prevent their being readily lifted into or out of a vehicle, as can be done with my mount.

The new, preferred, alternate embodiment of my invention is the tripod mount shown in Fig. 7, which tripod has a wheel affixed to one leg, and also has the other two legs capable of being rotated toward each other, whereby the mount may be wheeled like a wheelbarrow for ease of movement from place to place.

Essentially, this mount comprises the horizontal seat portion 15 from which the legs 16, 17 and 18 extend radially outward and are equally spaced angularly with respect to each other, as viewed in Fig. 7. The seat portion of the mount, upon which portion the gun and its appurtenances are attached, has an internal reinforcement in the form of a trunnion 19 to which leg 16 is rigidly attached and about which leg 17 and leg 18 are rotatable, when in an unlocked condition. The gun is fired when the legs of the mount are in the aforementioned equi-angular position, whether from the vehicle or from a ground emplacement. Legs 17 and 18 are similar in shape and construction, but of opposite reference (i.e., leg 17 may be considered as the left leg, and leg 18 may be considered as the right leg). These legs extend outwardly essentially horizontally and each has a riser 20 depending from its free ends. The free ends of these risers terminate below the tripod's seat portion in an imaginary plane which is parallel thereto.

Leg 16 also extends outwardly, essentially horizontally, and has, at its free end, the wheel 21 rotatably attached thereto; the circumference of the wheel being substantially tangent to the same imaginary plane in which the risers terminate.

In order that the tripod may be easily and rapidly attached to, or detached from, the jeep 47, or other carrier, legs 17 and 18 are each equipped with a handle and latch assembly 22. Each handle 23 of the just named assembly has an angular portion 45 which is pivotally attached at its end where it enters an opening in the free end of the respective leg. The clamp 24 of each handle-latch assembly likewise extends through the aforementioned opening and is pivotally mounted in a recess in the end of the handle adjacent the latter's pivotal connection whereby it may be moved to or from a clamping position.

In operation, handle 23 is raised from the position shown in Fig. 8 to the horizontal position shown in Fig. 8A. This movement of the handle causes the clamp 24, which is pivotally attached thereto, to be lowered and moved out of contact with the frame extension of the jeep 47, or other vehicle, thereby placing the clamp in the open position. The handles while in the horizontal position serve as a gripping means whereby the mount with its superimposed gun and appurtenances, when removed from the vehicle, may be readily moved by one man, in much the same manner as a wheelbarrow. To accomplish this an abutment stop 46 located on the leg prevents the handle from rotating out of the horizontal position.

When the mount is returned to the vehicle, downward movement of the handle 23 causes the clamp to engage the jeep and hold the mount securely in place thereon. During the clamping action, the pivotal end of the clamp passes over the center of the handle pivotal point, whereby the handle is urged against the walls of the risers.

A locking device is provided to hold the legs 17 and 18 either in the equi-angular position when attached to the vehicle or for emplacement use, or in a rotated position for movement as a wheelbarrow. The lock comprises a key 28 slidably arranged within the stationary leg 16 and attached to an eccentric rod 29 actuated by the lever 30, the key moving in and out of the locking grooves 31, located on the rim of the legs 17 and 18.

I claim:

1. In a tripod mount and recoilless rifle supported thereby, the combination therewith of the improvement enabling said rifle and tripod to be quickly locked to and unlocked from a carrying position in a vehicle, said improvement including at least one of the tripod legs being provided with a pivoted locking handle, an extension portion of a vehicle frame on which said tripod leg is supported and to which it is locked, said handle being pivoted to said leg and a hook pivoted to said handle adjacent to the handle pivot but on an opposite side from the frame extension on which said leg is supported for said hook to engage an underside of said frame extension, whereby angular movement of said handle away from said leg causes said hook to move downward and away from its cooperation with said frame extension and whereby said tripod leg and rifle may be quickly lifted from said vehicle without a delay in unscrewing any part of the tripod from the vehicle.

2. A combination according to claim 1 in which an abutment stop is provided on said leg to limit an upward swing of said handle and whereby the tripod and rifle may be lifted from the vehicle by said handle.

3. A combination according to claim 1 with which a riser is substantially disposed at an end portion of said leg with said handle being provided with an angular portion shaped to extend over and down said riser generally parallel therewith when the structure is in its clamped position and said hook contacts the underside of said frame extension.

References Cited in the file of this patent

UNITED STATES PATENTS

| | | |
|---|---|---|
| 1,280,304 | Roberts | Oct. 1, 1918 |
| 1,977,629 | Heavey | Oct. 23, 1934 |
| 2,439,564 | D'Ardenne et at. | Apr. 13, 1948 |
| 2,604,302 | Francis | July 22, 1952 |
| 2,646,956 | Cadwell et al. | July 28, 1953 |
| 2,668,682 | Dalton | Feb. 9, 1954 |

FOREIGN PATENTS

| | | |
|---|---|---|
| 527,342 | Great Britain | Oct. 7, 1940 |